(12) United States Patent
Ward et al.

(10) Patent No.: US 10,362,849 B2
(45) Date of Patent: Jul. 30, 2019

(54) LICE AND NIT REMOVAL TOOL AND METHOD

(71) Applicant: Wipe & Remove Nits, LLC, Holland, MI (US)

(72) Inventors: Dawn Julie Ward, Holland, MI (US); Frances A. Elenbaas, Ada, MI (US)

(73) Assignee: Wipe & Remove Nits, LLC, Holland, MI (US)

( * ) Notice: Subject to any disclaimer, the term of this patent is extended or adjusted under 35 U.S.C. 154(b) by 378 days.

(21) Appl. No.: 15/177,831

(22) Filed: Jun. 9, 2016

(65) Prior Publication Data

US 2017/0354226 A1 Dec. 14, 2017

(51) Int. Cl.
*A01M 3/04* (2006.01)
*A01M 3/00* (2006.01)
(Continued)

(52) U.S. Cl.
CPC .............. *A45D 24/00* (2013.01); *A01M 3/00* (2013.01); *A01M 3/04* (2013.01); *A45D 24/30* (2013.01)

(58) Field of Classification Search
CPC A01M 1/00; A01M 1/14; A01M 3/00; A01M 3/04; A45D 7/00; A45D 7/04;
(Continued)

(56) References Cited

U.S. PATENT DOCUMENTS

| 395,640 A | * | 1/1889 | Thum | A01M 1/14 |
| | | | | 43/114 |
| 877,960 A | * | 2/1908 | Stafford | A45D 2/00 |
| | | | | 132/212 |

(Continued)

FOREIGN PATENT DOCUMENTS

| EP | 0221004 A2 | 6/1987 | |
| WO | WO -2006097750 A1 * | 9/2006 | A45D 24/30 |

(Continued)

OTHER PUBLICATIONS

Fusible Thermolam Plus Product Description, available at least as of May 2016.
(Continued)

*Primary Examiner* — Darren W Ark
(74) *Attorney, Agent, or Firm* — Warner Norcross + Judd LLP

(57) ABSTRACT

A lice removing apparatus and method of using it are disclosed. The apparatus comprises a flexible fabric sheet having a pair of pockets defined on a first side of the sheet adjacent opposite ends of the sheet. A second side of the sheet includes a plurality of projections, or other physically coarse material, that strip nits from a person's hair when passed there over. A user inserts his fingers and thumb into the pockets, folds the sheet around a lock of hair, and runs the sheet along the length of the hair while squeezing the folded sheet into constant contact with the hair. Thereafter, the sheet is discarded and a new one is used for cleaning a subsequent lock of hair. The sheets may be stored in a contained in a manner that provides easy access for grasping the sheet and removing it from the container with one hand.

15 Claims, 9 Drawing Sheets

(51) Int. Cl.
*A45D 24/00* (2006.01)
*A45D 24/30* (2006.01)

(58) Field of Classification Search
CPC . A45D 7/06; A45D 7/065; A61Q 5/00; A61Q 5/04; A61Q 5/06
USPC ........ 43/132.1, 133, 134, 136; 132/200–203, 132/207–209
See application file for complete search history.

(56) References Cited

U.S. PATENT DOCUMENTS

| | | | | |
|---|---|---|---|---|
| 1,722,400 A * | 7/1929 | Stevens | B24D 15/066 | 15/214 |
| 1,829,826 A * | 11/1931 | Gaire | A45D 2/34 | 132/231 |
| 1,905,399 A * | 4/1933 | Wagner | A45D 2/48 | 132/139 |
| 2,252,551 A * | 8/1941 | Brollier | A45D 40/26 | 132/320 |
| 2,517,089 A * | 8/1950 | Dean | A01K 97/16 | 118/DIG. 22 |
| 3,205,527 A * | 9/1965 | Laird | A47L 17/00 | 15/104.9 |
| 3,255,765 A * | 6/1966 | Sturdivant | A45D 2/127 | 132/223 |
| 3,608,565 A * | 9/1971 | Ensign | A45D 8/00 | 132/212 |
| 3,640,031 A * | 2/1972 | Descant | B24D 15/02 | 451/522 |
| 3,871,388 A * | 3/1975 | Leoci | A45D 2/00 | 132/223 |
| 4,126,962 A * | 11/1978 | Polcaro | A01G 7/06 | 15/210.1 |
| 4,144,897 A * | 3/1979 | Mosz | A45D 19/0008 | 132/270 |
| 4,279,103 A * | 7/1981 | Rodarte | B24D 15/023 | 15/220.3 |
| 4,450,196 A * | 5/1984 | Kamat | A41D 27/06 | 156/148 |
| 4,649,861 A * | 3/1987 | Elkins | A01M 1/14 | 119/28.5 |
| 4,815,232 A * | 3/1989 | Rawski | A01K 13/002 | 119/625 |
| 4,852,517 A * | 8/1989 | Smith | A01M 1/14 | 119/28.5 |
| 4,942,893 A * | 7/1990 | Trottier | A45D 19/0008 | 132/208 |
| 4,972,543 A * | 11/1990 | Michaels | G01F 23/045 | 15/220.4 |
| D324,278 S * | 2/1992 | Agajan, Jr. | D28/7 | |
| 5,228,465 A * | 7/1993 | Hill | A45D 2/001 | 132/212 |
| 5,233,787 A * | 8/1993 | Andersen | A01K 13/003 | 119/28.5 |
| 5,295,278 A * | 3/1994 | Condon | A46B 5/0012 | 15/104.04 |
| 5,569,064 A * | 10/1996 | Gleadall | B24D 15/066 | 451/558 |
| 5,743,278 A * | 4/1998 | Ookura | A45D 7/00 | 132/118 |
| 5,972,987 A * | 10/1999 | Reid | A61K 8/466 | 424/600 |
| 5,977,186 A * | 11/1999 | Franklin | A01N 27/00 | 510/382 |
| 6,006,758 A * | 12/1999 | Thorne | A45D 24/30 | 132/137 |
| 6,098,633 A * | 8/2000 | Pabari | A45D 24/30 | 132/137 |
| 6,115,958 A * | 9/2000 | Enderle | A01M 3/04 | 294/25 |
| 6,524,602 B1 * | 2/2003 | Burkhart | A61K 9/0046 | 424/405 |
| 6,565,665 B2 * | 5/2003 | Altschuler | A45D 24/40 | 134/6 |
| 6,607,716 B1 * | 8/2003 | Smith | A61Q 5/00 | 424/642 |
| 6,626,599 B2 * | 9/2003 | De Laforcade | A45D 19/02 | 132/108 |
| 6,651,379 B1 * | 11/2003 | Nelson | A01M 3/04 | 43/114 |
| 6,663,876 B2 * | 12/2003 | Campbell | A01N 37/02 | 424/406 |
| 6,683,065 B1 * | 1/2004 | Holzer | A01N 55/00 | 424/405 |
| 6,718,686 B2 * | 4/2004 | Marsh | A01M 3/04 | 43/114 |
| 6,746,165 B2 * | 6/2004 | de Laforcade | A45D 19/02 | 132/221 |
| 7,000,619 B2 * | 2/2006 | Winckels | A45D 19/0008 | 132/208 |
| 7,059,081 B2 * | 6/2006 | Nourigat | A01M 1/2011 | 43/131 |
| 7,090,833 B2 * | 8/2006 | Coleman | A61K 8/34 | 424/70.1 |
| 7,117,873 B2 * | 10/2006 | Bachrach | A45D 24/30 | 132/148 |
| 7,210,265 B2 * | 5/2007 | Jacobson | A01M 3/04 | 43/114 |
| 7,676,986 B2 * | 3/2010 | Nelson | A01M 3/04 | 43/114 |
| 7,866,326 B2 * | 1/2011 | Mills | A45D 19/0008 | 132/112 |
| 7,909,042 B2 * | 3/2011 | Bachrach | A45D 24/30 | 132/159 |
| 8,178,116 B2 * | 5/2012 | Campbell | A01N 37/02 | 424/405 |
| 8,215,051 B2 * | 7/2012 | Alexander | A01G 13/0281 | 43/132.1 |
| 8,342,188 B2 * | 1/2013 | Pabari | A45D 24/30 | 132/126 |
| 8,474,176 B2 * | 7/2013 | Shelton | A45D 24/30 | 132/148 |
| 8,479,748 B1 * | 7/2013 | Satir | A45D 24/10 | 132/108 |
| 8,511,321 B2 * | 8/2013 | Sanz | A45D 24/30 | 132/219 |
| D705,988 S * | 5/2014 | Scott | D28/7 | |
| 8,770,208 B2 * | 7/2014 | Meinig | A01K 13/00 | 132/120 |
| 8,815,270 B2 * | 8/2014 | Campbell | A01N 37/02 | 424/406 |
| 8,955,525 B2 * | 2/2015 | Tiram | A45D 24/04 | 132/112 |
| 8,967,157 B2 * | 3/2015 | Steiner | A45D 24/10 | 132/150 |
| 9,119,387 B2 * | 9/2015 | Moss | A01M 1/14 | |
| 9,307,820 B2 * | 4/2016 | Ritterband | A45D 19/14 | |
| 9,326,579 B2 * | 5/2016 | Steiner | A45D 24/10 | |
| 9,393,274 B2 * | 7/2016 | Pinnock | A61K 35/742 | |
| 9,655,426 B2 * | 5/2017 | Bremner | A45D 19/0008 | |
| 2006/0248785 A1 * | 11/2006 | Shelton | A01M 3/04 | 43/134 |
| 2007/0295350 A1 * | 12/2007 | Shelton | A01M 3/04 | 132/137 |
| 2008/0083420 A1 * | 4/2008 | Glenn | A45D 19/0008 | 132/208 |
| 2008/0276954 A1 * | 11/2008 | Pienaar | A45D 19/16 | 132/212 |
| 2009/0071496 A1 * | 3/2009 | Glenn, Jr. | A45D 19/0008 | 132/208 |
| 2010/0049286 A1 * | 2/2010 | Thorsen | A45D 20/22 | 607/107 |
| 2010/0086577 A1 * | 4/2010 | Munoz | A45D 1/04 | 424/405 |
| 2011/0118686 A1 * | 5/2011 | Vega | A61F 13/8405 | 604/367 |
| 2011/0120487 A1 * | 5/2011 | Rollat-Corvol | A45D 19/02 | 132/200 |

(56) References Cited

U.S. PATENT DOCUMENTS

| | | | | |
|---|---|---|---|---|
| 2011/0197338 | A1* | 8/2011 | Coyne | A45D 20/00 2/161.6 |
| 2011/0240051 | A1* | 10/2011 | Shelton | A01M 3/04 132/200 |
| 2014/0060563 | A1* | 3/2014 | Haynes | A46B 5/04 132/200 |
| 2017/0020259 | A1* | 1/2017 | Lightsey | A45D 7/04 |
| 2017/0049110 | A1* | 2/2017 | Kolender | A01N 25/00 |
| 2017/0049207 | A1* | 2/2017 | Tal | A45D 8/34 |
| 2017/0119143 | A1* | 5/2017 | Steiner | A46D 1/0261 |
| 2018/0020820 | A1* | 1/2018 | Crone | A46B 9/023 15/1.52 |

FOREIGN PATENT DOCUMENTS

| | | | | |
|---|---|---|---|---|
| WO | WO -2009114896 A1 * | 9/2009 | | A45D 24/30 |
| WO | WO -2017072756 A1 * | 5/2017 | | |

OTHER PUBLICATIONS

Lice Knowing You School and Play Plus Hair Wipe Aways, 8 Ounce, available at least as of May 2016.

* cited by examiner

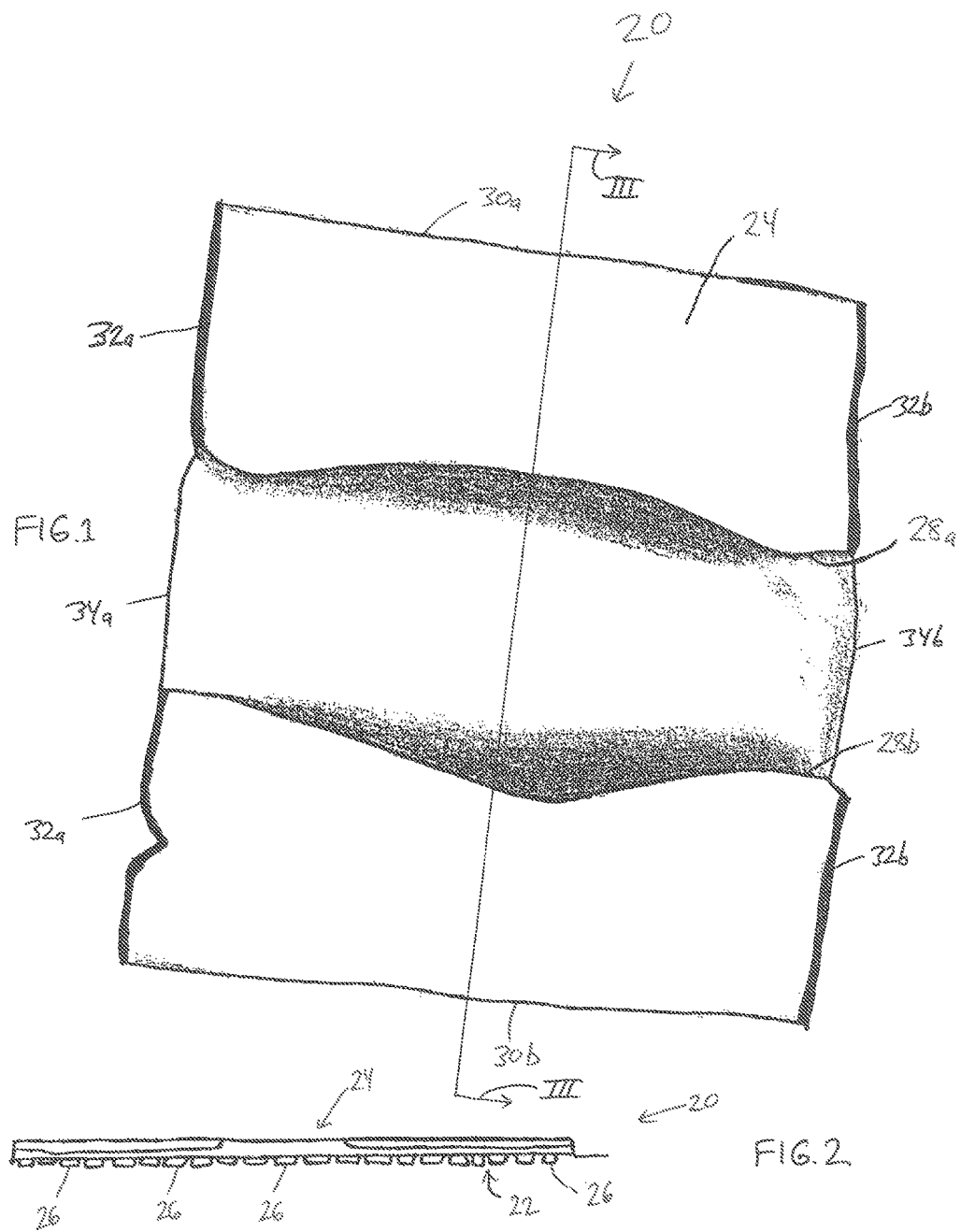

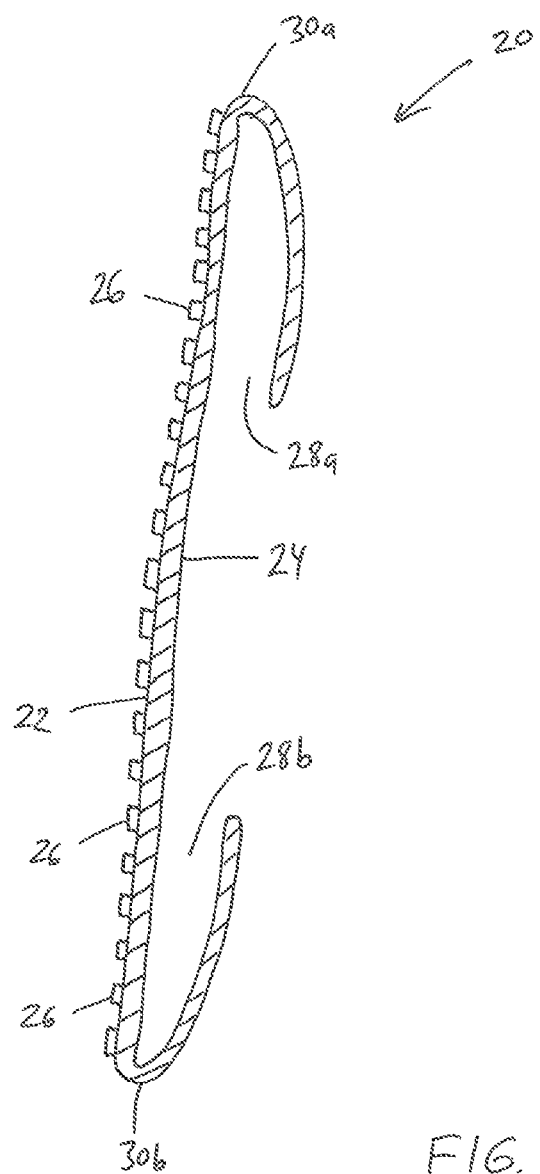

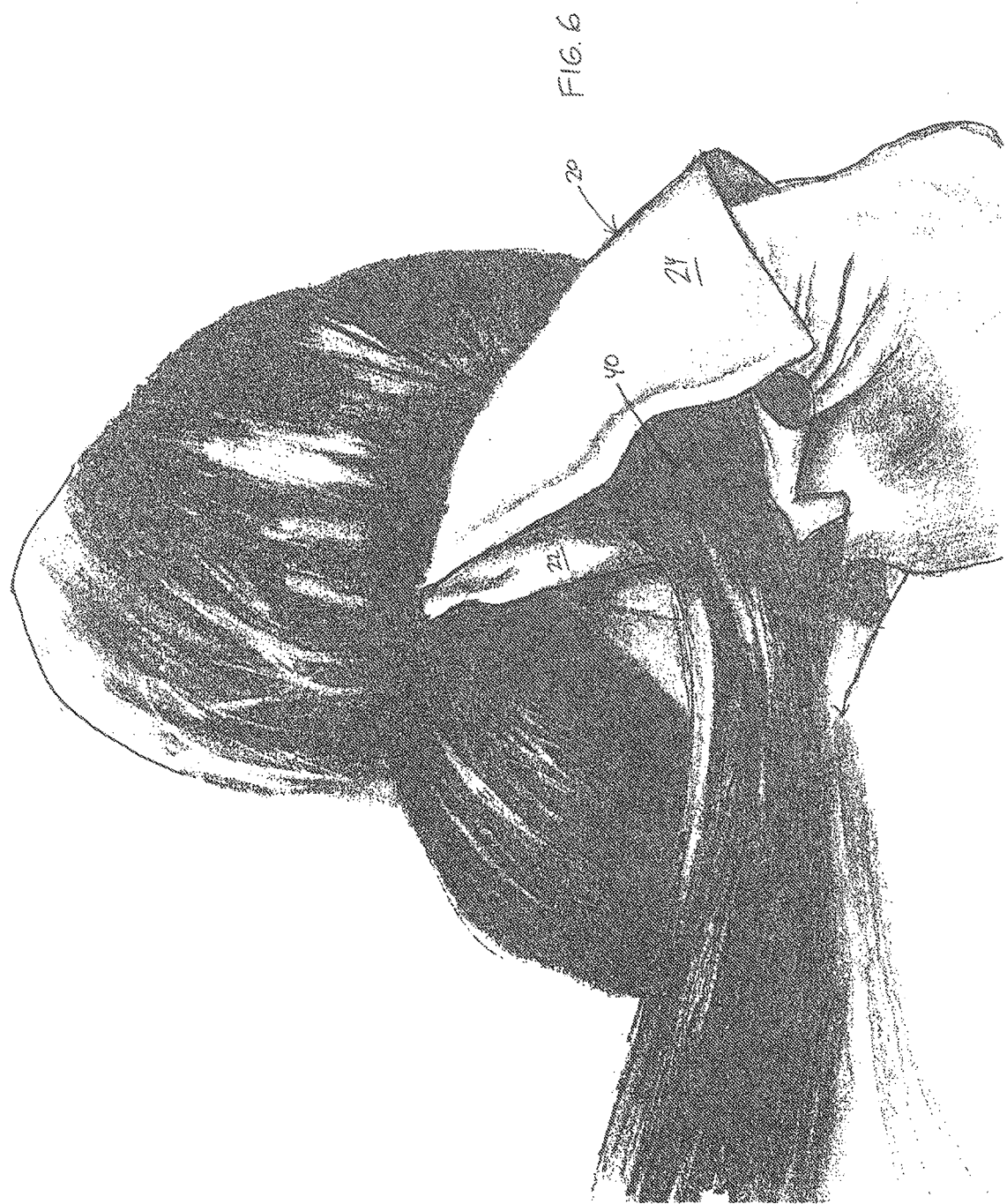

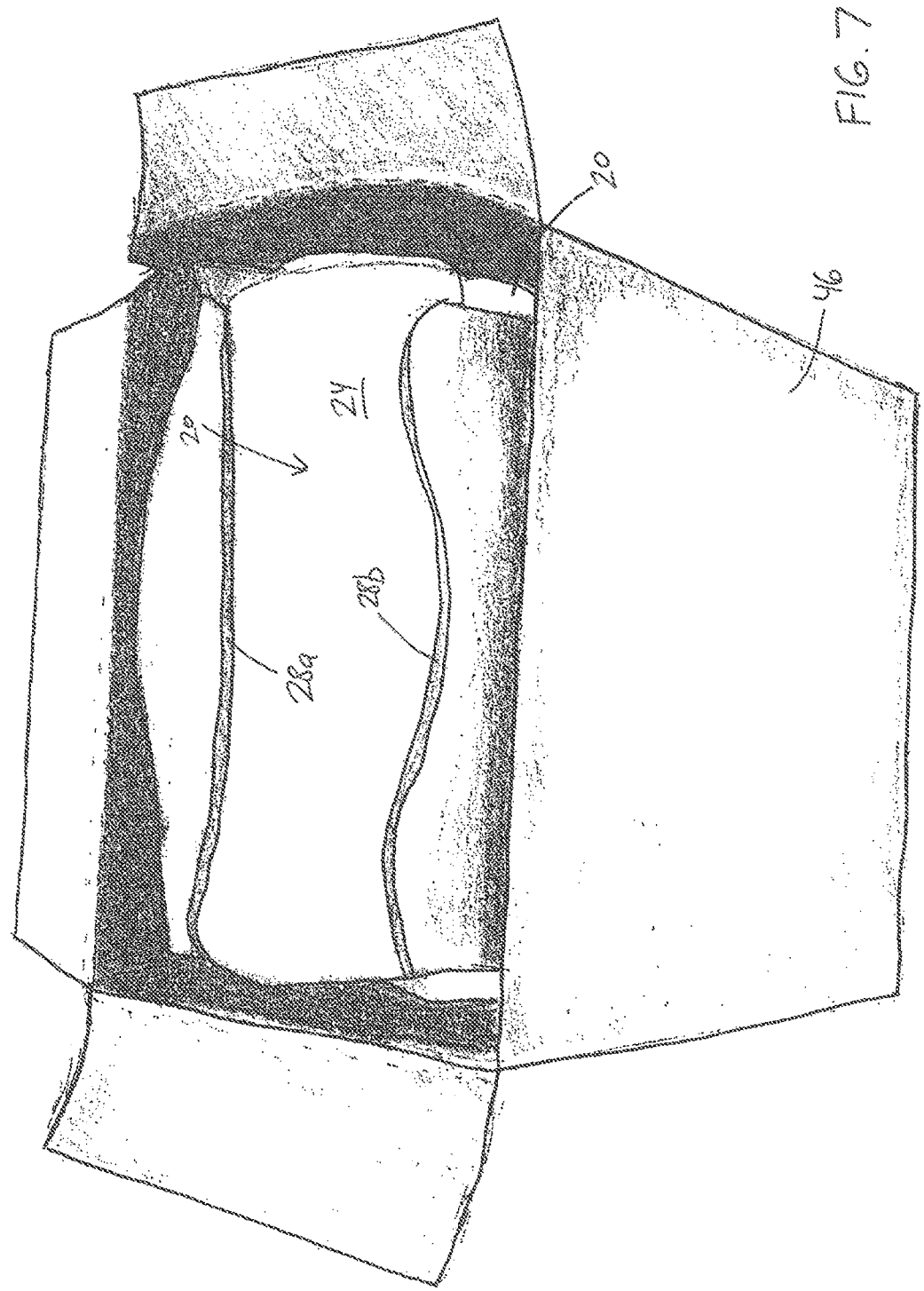

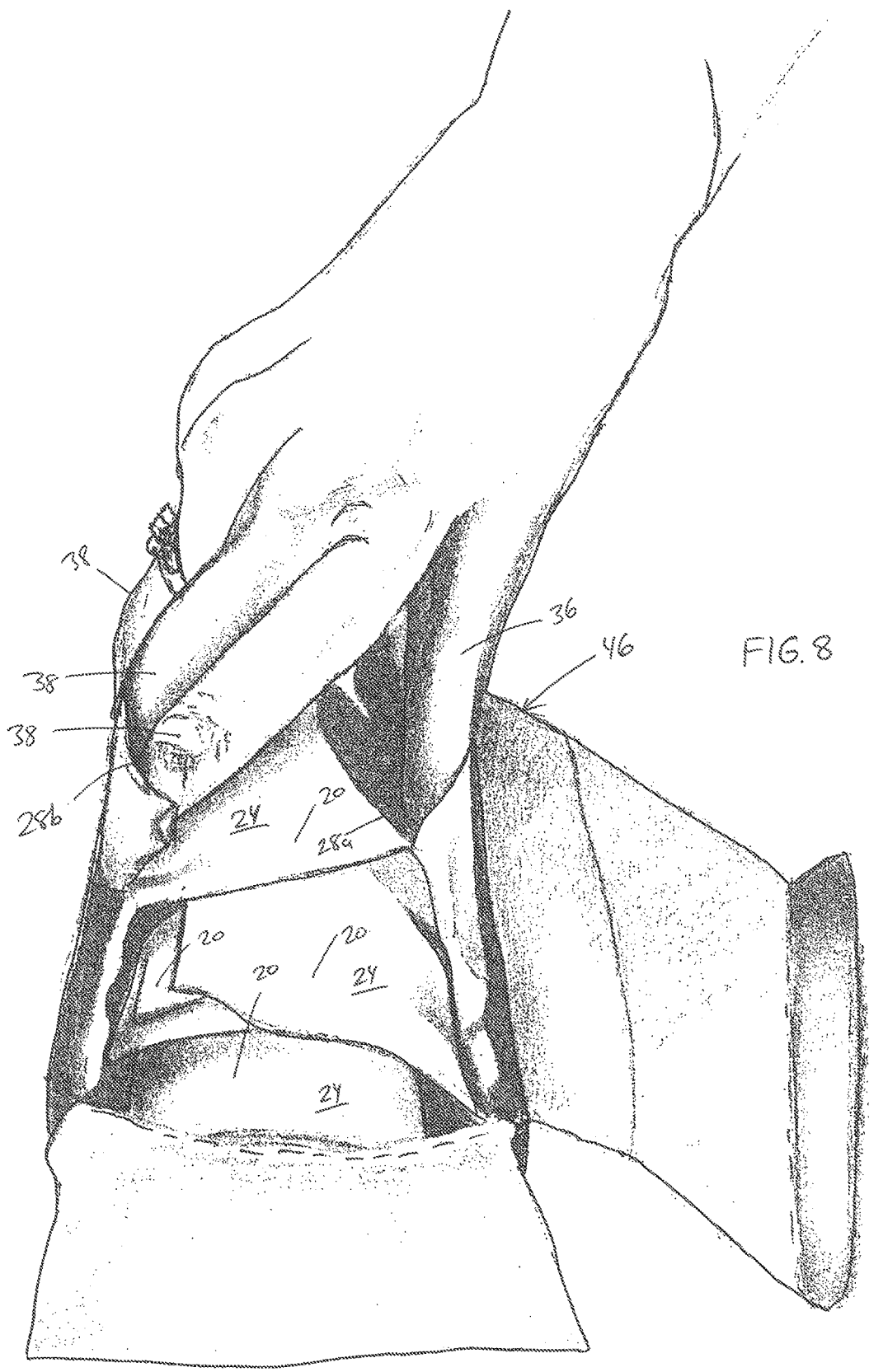

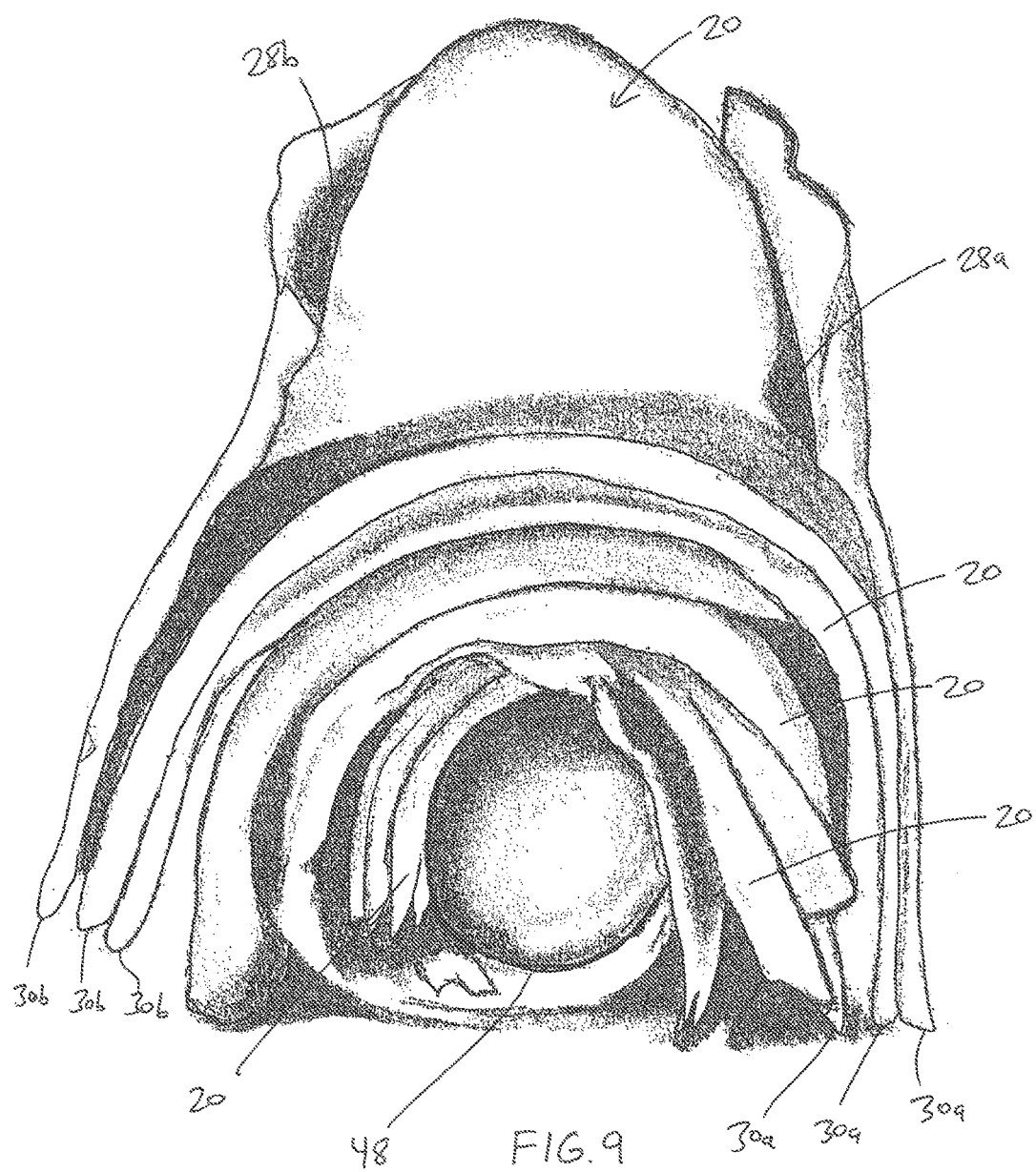

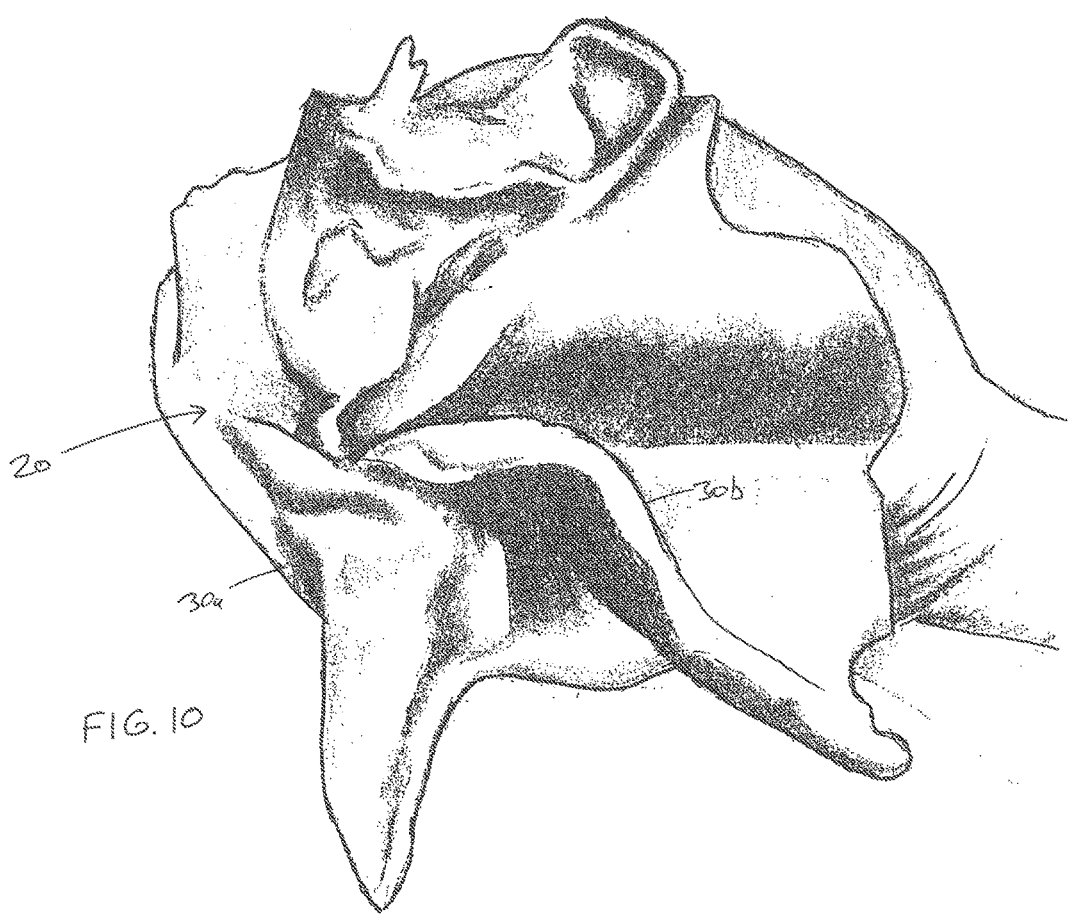

LICE AND NIT REMOVAL TOOL AND METHOD

BACKGROUND

The present invention relates to hair lice, and more specifically to a tool and methods for removing lice and lice nits from a person's hair.

Head lice continues to be a large problem for a large number of individuals. In the United States, it has been estimated that head lice infects 10-12 million children each year. Typical treatments for removing the lice and their nits involves (1) application of one or more chemicals to the scalp of the infected individual; (2) repeatedly running a fine-toothed comb through the infected individual's hair in an attempt to strip the lice and nits from the strands of hair; and (3) manually picking nits out of the infected individual's hair one-by-one, using either a person's fingers or one or more tools. All of these methods suffer from one or more disadvantages, such as consuming excessive amounts of time, not being completely effective, requiring repeated applications of the treatment, being financially expensive, potentially damaging the infected individual's hair, failing to contain the nits, potentially re-introducing stripped lice or nits back into the infected individual's hair, and/or requiring excessive clean-up.

SUMMARY OF THE INVENTION

According to one aspect of the present invention, an improved lice and nit removal apparatus and method are provided. The apparatus and method allow for easier and more efficient removal of nits while reducing one or more of the disadvantages of the various prior art treatment techniques. In general, the apparatus and methods disclosed herein substantially prevent the reintroduction of nits back into the infected individuals' hair (or introduction into anyone else's hair), effectively remove the nits from the individual's hair, and contain the stripped nits in an easy and convenient manner.

According to a first embodiment, a method for removing lice nits from a person's hair is provided. The method includes grasping a first fabric sheet having a plurality of projections on a first face of the first fabric sheet; folding the first fabric sheet around a first lock of the person's hair such that the first face of the first fabric sheet contacts the first lock of the person's hair; squeezing the first fabric sheet while folded around the first lock of the person's hair; moving the first fabric sheet lengthwise along the first lock of the person's hair while squeezing the first fabric sheet around the first lock of the person's hair; disposing of the first fabric sheet; and then repeating the aforementioned steps with one or more additional fabric sheets.

According to another embodiment, another method for removing lice nits from a person's hair is provided. This method includes providing a fabric sheet having a plurality of projections on a first face of the fabric sheet; having a person insert his or her thumb into a first pocket defined on a second face of the fabric sheet, the first pocket defined adjacent a first end of the fabric sheet; having the person insert one or more of his or her fingers into a second pocket defined on the second face of the fabric sheet, the second pocket defined adjacent a second end of the fabric sheet; folding the fabric sheet around a lock of the person's hair such that the first face of the fabric sheet contacts the lock of the person's hair; squeezing the fabric sheet around the lock of the person's hair such that the first and second ends are pressed against the lock of the person's hair and each other; and moving the fabric sheet lengthwise along the lock of the person's hair while squeezing the fabric sheet around the lock of the person's hair.

According to still another embodiment, an apparatus is provided for removing lice nits from a person's hair. The apparatus comprises a fabric sheet, a first pocket, a second pocket, and a plurality of projections. The fabric sheet includes a first face, a second face, a first end, and a second end. The plurality of projections are defined on the first face of the fabric sheet. The first pocket is defined on the second face of the fabric sheet adjacent the first end. The second pocket is defined on the second face of the fabric sheet adjacent the second end. The first and second pockets are dimensioned and positioned to allow a user to insert a plurality of his or her digits into the first and second pockets while squeezing the first and second ends toward each other when a lock of the person's hair is positioned between the first and second ends.

According to other aspects, one or both of the methods include using fabric sheets that include a non-woven fabric layer. In some embodiments, the non-woven fabric sheets are made from a needled fleece material. In some embodiments, the fabric sheets are made from a fusible fabric that has not been fused.

The fabric sheets may be stored in a container in such a manner that a user can easily remove them from the container by inserting his or her fingers and thumb into the pockets of one of the fabric sheets and then lifting the fabric sheet from the container. Once removed from the container in this manner, the sheet is ready to be folded over a lock of the person's hair. The user therefore does not need to do any repositioning or re-grasping of the sheet after removing it from the container and prior to using it to strip and capture nits from the person's hair.

The fabric sheets are constructed, in some embodiments, to mechanically strip the nits from the hair and capture the stripped nits such that they remain attached to the fabric sheet, rather than falling off and spreading to other locations. Subsequent disposal of the fabric sheet with the stripped nits clinging to the sheet therefore prevents the nits from spreading to the premises where the nit stripping is taking place and/or being reintroduced back into the infected individual's hair.

In some embodiments, the projections on the fabric sheet are made from a thermoactive adhesive material adapted to become sticky in response to applied heat. The thermoactive adhesive material does not become thermally active in response to the normal body heat generated in the person's fingers and thumbs.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 1 is a plan view of an apparatus for removing nits from a person's hair according to one embodiment;

FIG. 2 is a side view of the apparatus of FIG. 1;

FIG. 3 is a cross-sectional view of the apparatus of FIG. 1 taken along the line III-III of FIG. 1.

FIG. 6 is a perspective view of the apparatus of FIG. 1 shown being applied to a lock of the infected person's hair;

FIG. 7 is a perspective view of the apparatus of FIG. 1 shown in a container containing a plurality of the apparatuses;

FIG. 8 is a perspective view of a user's hand removing the apparatus from the container of FIG. 7 using the pockets defined in the apparatus;

FIG. 9 is a perspective view of a plurality of the apparatuses shown nested together illustrating one manner in which they may be contained within the container prior to use; and FIG. 10 is a perspective view of the apparatus of FIG. 1 showing it in a crumpled state after being used;

DETAILED DESCRIPTION OF THE EMBODIMENTS

Figure 4:
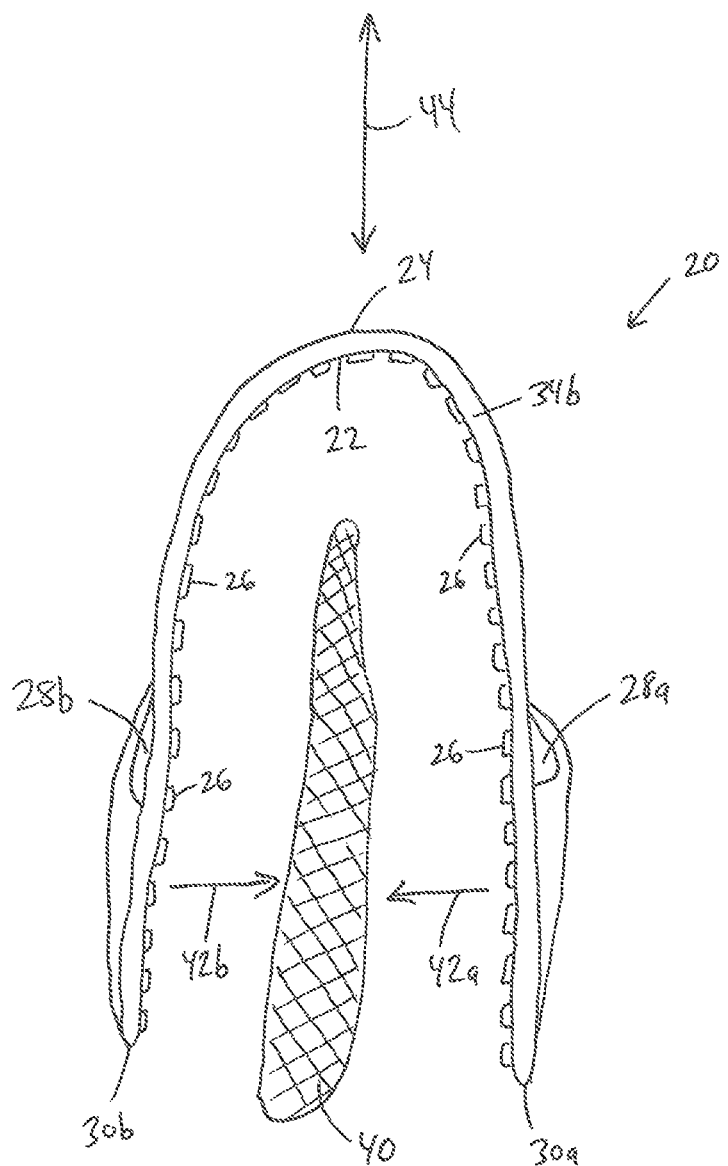
FIG. 4 is a side view of the apparatus of FIG. 1 shown in a folded configuration for wrapping around a lock of a person's hair.

A lice/nit removal apparatus 20 according to one embodiment of the invention is shown in FIG. 1. Lice/nit removal apparatus 20 is made of a flexible fabric sheet having a generally square shape, although it will be understood by those skilled in the art that the shape of lice/nit removal apparatus 20 can vary from what is shown in FIG. 1. As can be seen more clearly in FIGS. 2 and 3, lice/nit removal apparatus 20 includes a first face 22 and a second face 24. First face 22 includes a plurality of projections 26 that are adapted to help facilitate the stripping and capture of nits from a person's hair, as will be explained in greater detail below. Second face 24, which is opposite first face 22, does not include the projections 26 in the illustrated embodiment because second face 24 is not intended to contact the person's hair. It will be understood, however, that second face 24 could be modified from the embodiment shown to include projections 26 as well, if desired.

A first pocket 28a is defined on second face 24 of lice/nit removal apparatus 20 generally adjacent a first end 30a of lice/nit removal apparatus 20 (FIGS. 1-3). A second pocket 28b is defined on second face 24 of lice/nit removal apparatus 20 generally adjacent a second end 30b of lice/nit removal apparatus 20. First and second pockets 28a and 28b are configured to receive the finger(s) and thumb of a user, as will be discussed in greater detail below.

In the illustrated embodiment, each of the pockets 28a and 28b include a pair of seams 32a and 32b defined along their respective sides (FIG. 1). Seams 32a and 32b are located at positions that are generally aligned with each of sides 34a and 34b of lice/nit removal apparatus 20. It will be understood by those skilled in the art, however, that the location of seams 32a and 32b can be changed from that shown in the illustrated drawings. For example, seams 32a and 32b could be moved inwardly from sides 34a and 34 toward the interior of lice/nit removal apparatus 20 in order to reduce the size of pockets 28a and 28b. Still further, the shape of seams 32a and 32b and/or their orientation can be changed from that shown. In the illustrated embodiment, seams 32a and 32b are formed by adhesive, although it will be understood that other methods may be used, such as stitching, thermal bonding, fasteners, or the like.

In at least one embodiment, the fabric sheet from which lice/nit removal apparatus 20 is constructed is made from a needled fleece material, such as, but not limited to, type TP971F Fusible Thermolam® Plus, marketed by Pellon Consumer Products of Saint Petersburg, Fla., where the needling forms projections 26. In an alternative embodiment, the fabric sheet from which lice/nit removal apparatus 20 is constructed is made from the type of material disclosed in U.S. Pat. No. 4,450,196 issued to Kamat and entitled Composite Fusible Interlining Fabric and Method, the complete disclosure of which is hereby incorporated herein by reference. As disclosed in the '196 patent, the fabric includes a non-woven layer and a plurality of thermoactive adhesive dots secured thereto on at least one face of the fabric. When lice/nit removal apparatus 20 is made from the material disclosed in the '196 patent, the thermoactive adhesive dots form projections 26. Further, when used from this material, the adhesive properties of the themoactive adhesive dots are not utilized as the amount of heat necessary to activate these thermoactive adhesive dots is more than the body heat provided by the user whose finger(s)/thumb are inserted into pockets 28a and 28b. Thus, when using the material of the '196 patent, the thermoactive adhesive dots are not used for securing the fabric to another fabric, but instead are used to assist in the process of scraping and capturing nits from the person's hair.

Other materials besides the specific ones mentioned above may also be used for constructing lice/nit removal apparatus 20. In general, such materials should be flexible fabric materials (whether woven or non-woven) having physical projections on at least one face of the material that facilitate the physical scraping of nits from a person's hair. Still further, the flexible fabric should be made from a material that retains the nits in contact with the material after being stripped from the person's hair, rather than allowing the nits to fall onto the floor or other surface. Such retainment may be accomplished by any suitable means, such as electrostatic attraction, fibrous physical gripping of the nits, folds, mild adhesive properties, and/or any combination of these or other means. In some embodiments, the flexible fabric is made from recycled plastics (post-consumer or post-industrial), or from non-petroleum sources such as, but not limited to, natural fibers like bamboo or plant based polymers (e.g. polyactic acid (PLA), polyhydroxybutyrate (PHB), polybutylene succinate (PBS), or others).

When using a nonwoven fabric, the fibers used in the fabric form a web as a result of the manufacturing process. This web has projections on its surface that are rough in nature and in close proximity to one another. The non-woven fabric should be selected so as to have projections that are sufficiently rough to trap the lice/nits.

Figure 5:
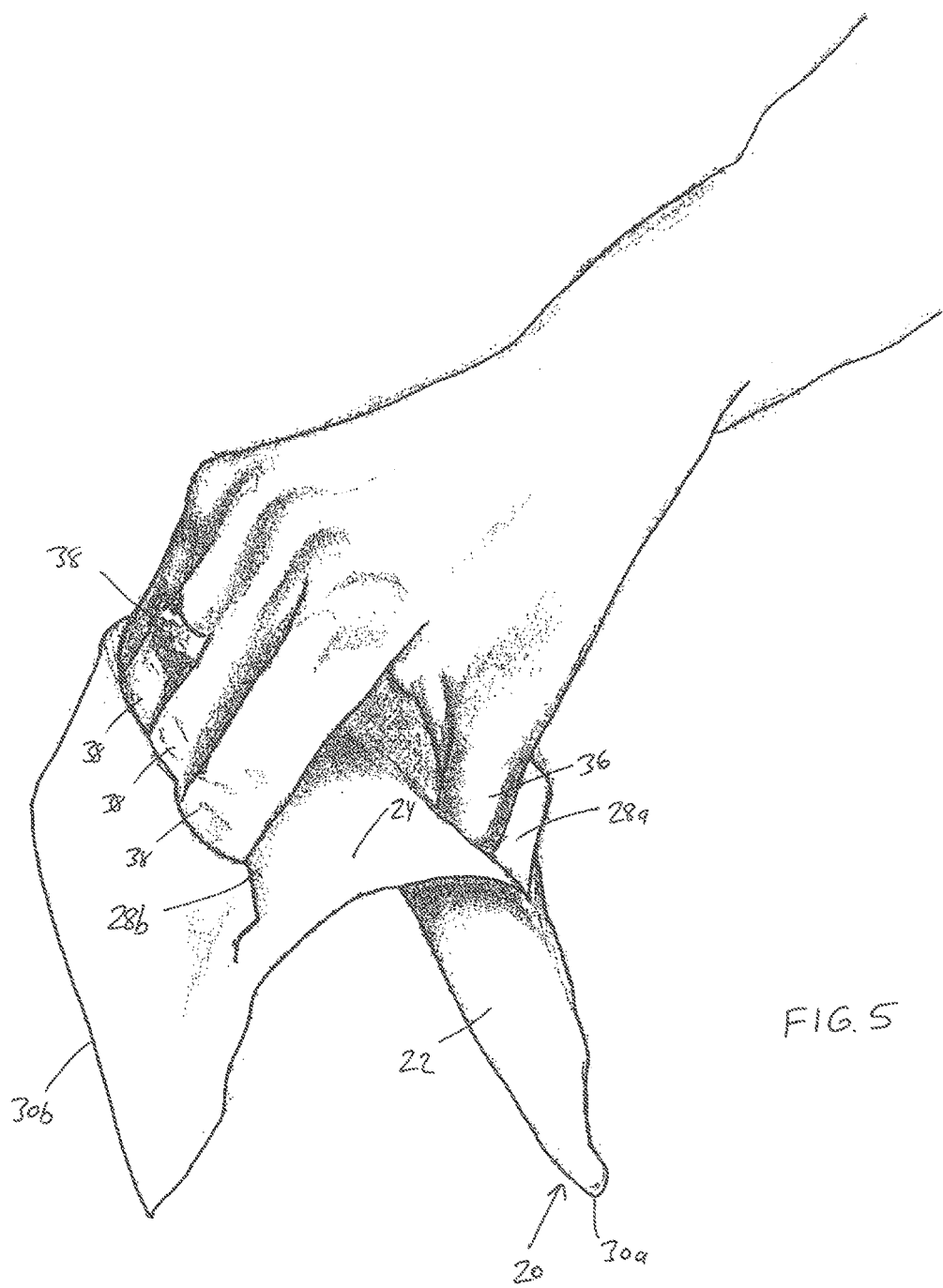
FIG. 5 is perspective view of the apparatus of FIG. 1 illustrating a users hand being inserted into pockets defined on the apparatus.

The manner in which lice/nit removal apparatus 20 is used to remove nits from a person's hair is better understood with reference to FIGS. 4-6. In order to use lice/nit removal apparatus 20, a user folds over the sheet of fabric comprising lice/nit removal apparatus 20 such that first end 30a is positioned generally near second end 30b, as shown in FIG.

4. Further, this folding is done such that the pockets 28a and 28b are positioned to face outward while projections 26 face inward. This folding is easily accomplished by the user with only a single hand by inserting his or her thumb 36 into one of pockets 28a and 28b, and one or more of his or her fingers 38 into the other of pockets 28a and 28b, such as shown in FIG. 5.

The user then grasps a lock 40 of the person's hair with his or her other hand. In the example shown in FIG. 4, the lock of hair 40 is depicted as a cross-sectional view of the hair with the individual strands of the person's hair extending into and out of the plane of FIG. 4. The amount of hair shown in FIG. 4 is also exaggerated for purposes of illustration. The amount of hair grasped by the user generally should be an amount that can be squeezed flat enough so as to have a thickness of substantially no more than a single layer of hair strands. The squeezing of the hair lock 40 into such a flattened shape helps ensure that all of the individual hair strands in the lock 40 will come into contact with projections 26 and/or first face 22 of lice/nit removal apparatus 20. Such contact provides the mechanism for stripping any nits in the lock of hair 40 off of the hair and onto lice/nit removal apparatus 20. A user, however, may grasp a lock of hair that is more than what can be squeezed flat into a single hair-width layer and still effectively remove nits by, for example, rubbing and/or rolling his or her thumb and fingers together, as discussed below.

After the user has grasped a lock of hair 40 with one of his or her hands and folded lice/nit removal apparatus 20, the user positions the lice removal apparatus such that it wraps around the lock of hair 40 generally in the manner shown in FIG. 4. Thereafter, the user squeezes his or her fingers 38 toward his or her thumb 36 in the directions indicated by arrows 42a and 42b. The lock of hair 40 is thus pinched and flattened between opposite portions of first face 22 of lice/nit removal apparatus 20 by the forces exerted by the users thumb and fingers (FIG. 6). This force urges first face 22 and projections 26 into contact with the individual strands of hair in the lock 40. The user then draws the lice/nit removal apparatus 20 along the length of the person's hair while continuing to squeeze his or her fingers and thumb together, thereby maintaining constant contact between the individual strands of hair and first face 22 (including projections 26) of lice/nit removal apparatus 20.

While the user is drawing the lice/nit removal apparatus 20 along the length of the person's hair, he or she may increase the effectiveness of the nit removal process by rubbing his or her thumb and finger(s) together. This rubbing may occur in multiple directions. For example, assuming that the user's thumb and finger(s) are oriented substantially parallel to axis 44 of FIG. 4 (which they would be when using lice/nit removal apparatus 20 shown in FIG. 4), the user may wish to slide his or her thumb lengthwise in the direction of arrow 44 along his or her finger(s) so that the points of contact between the user's thumb and finger(s) shifts lengthwise along the thumb and fingers. Alternatively, or additionally, the user may wish to roll his or her thumb and fingers with respect to each other while drawing the lice removal apparatus along the length of the person's hair. Such rolling changes the points of contact between the thumb and fingers, not in the lengthwise direction (direction 44), but rather with respect to the circumferential regions of the thumb and finger(s) that come into contact with each other. That is, if the users thumb and fingers are oriented substantially parallel to direction 44 of FIG. 4, the user may wish to move his or her thumb or finger in a direction perpendicular to direction 44 that extends out of or into the plane of the page of FIG. 4.

It will be understood by those skilled in the art that the "points of contact" referred to in the preceding paragraphs are not points at which direct contact is made between the user's thumb and finger(s). Instead, the contact points refer to the points where the users thumb and finger(s) would otherwise make direct contact with each other were they not separated by lice/nit removal apparatus 20 and the infected individual's lock of hair 40.

The aforementioned shifting and/or rolling of the person's thumb and finger(s) not only helps ensure that the lock of hair 40 is more effectively flattened between the users thumb and finger(s), but also tends to at least temporarily separate the hair strands from each other, thereby exposing their outer surfaces to contact with lice/nit removal apparatus 20. The shifting and/or rolling also helps to roll the hair strands along their longitudinal axes so that all of their surface area comes into contact with lice/nit removal apparatus 20 at least once, and perhaps repeatedly.

In order to more effectively remove the nits from the person's hair, the user may also wish to run the squeezed lice/nit removal apparatus 20 along the entire length of the lock of hair 40. Further, in order to avoid scraping and pulling nits toward the person's head, rather than away from the person's head, the user may wish to initially squeeze lice/nit removal apparatus 20 around the roots of the hairs in the lock 40, or as close as possible to the person's scalp. Thereafter, the user moves lice/nit removal apparatus 20 away from the person's head along the entire length of the hair strands, thereby scraping the nits off the hair and moving the removed nits away from the person's scalp.

After the user has used the lice/nit removal apparatus 20 to scrape nits from the entire length of the lock of hair, the user may wish to discard the used lice/nit removal apparatus 20 and grab a new lice/nit removal apparatus 20 for use with a second lock of hair. Disposing of each lice/nit removal apparatus 20 after a single pass along a lock of hair helps ensure that any stripped nits that are clinging to first face 22 and/or projections 26 are not carried to a second lock of hair that could be subsequently scraped with the used lice/nit removal apparatus 20. Instead, the scraped nits are maintained in the lice/nit removal apparatus 20 and make their way into the trash when the used lice/nit removal apparatus 20 is discarded.

In order to effectively remove nits from all of a person's hair while discarding each lice/nit removal apparatus 20 after a single pass, multiple lice removal apparatuses 20 will typically be needed. In order to facilitate the process of using multiple lice removal apparatuses 20, a container, such as container 46 of FIGS. 7-8 may be provided. Container 46 stores a plurality of lice removal apparatuses 20 in a manner that facilitates their easy removal from container 46 and subsequent use on a person's hair. More particularly, container 46 stores the lice removal apparatuses 20 in a manner that enables a user to grasp a single one of the lice removal apparatuses 20 with one hand and immediately use the apparatus 20 on a person's hair without requiring the person to use his or her other hand, or to reposition his or her fingers or thumb on the lice/nit removal apparatus 20. This can be better understood with reference to FIGS. 7-9.

FIG. 9 illustrates one manner in which lice removal apparatuses 20 may be stacked when inside of container 46 (container 46 is not shown in FIG. 9 in order to better illustrate the manner in which apparatuses 20 are stacked). Apparatuses 20 are draped over a roll 48, or other structure, positioned on the bottom of container 46. Each lice/nit removal apparatus 20 is draped in such a manner that second face 24 faces upwardly while first face 22 faces downwardly. By draping each of lice removal apparatuses 20 in this manner, both of the pockets 28a and 28b of the top-most lice/nit removal apparatus 20 are easily accessible from the top, thereby allowing a person to insert his or her fingers and thumb into pockets 28a and 28b while the lice/nit removal apparatus 20 is positioned inside of container 46, such as shown in FIG. 8. After the person has inserted his or her fingers and thumb into the pockets 28 of the top-most lice/nit removal apparatus 20, the person squeezes his or her fingers and thumb together sufficiently to grip the lice/nit removal apparatus 20 such that, when he or she pulls upwardly on the apparatus 20, it is lifted out of the container 46.

After being lifted out of the container 46, the person's finger(s) and thumb are already positioned inside of pockets 28a and 28b, and therefore immediately in proper position for using the lice/nit removal apparatus 20 on a person's hair. The user can therefore easily grasp and remove a first lice/nit removal apparatus 20 from container 46 with one hand, use the first lice/nit removal apparatus 20 with the same hand to pass it over a lock of hair 40, dispose of it, and grasp a second lice/nit removal apparatus 20 with the same hand, pass it over another lock of hair 40, dispose of it, and so on. The users other hand therefore remains free at all times to hold onto and manage the infected hair so that the hair locks that have been cleaned are maintained separately from those that have yet to be cleaned.

When the user is ready to discard a lice/nit removal apparatus 20 that has been passed over a person's hair, the user can simply crumple the lice/nit removal apparatus 20 while the users fingers and thumb remain in the pockets 28a and 28b, such as shown in FIG. 10. By crumpling the lice/nit removal apparatus 20 with the fingers and thumb still in the pockets, the lice/nit removal apparatus 20 can be folded such that those areas of first face 22 that were in contact with the person's hair are safely wrapped up by other portions of the lice/nit removal apparatus 20. This ensures that any scraped nits that might get dislodged from lice/nit removal apparatus 20 do not have the opportunity to fall onto the floor, or other surface underneath lice/nit removal apparatus 20. Instead, such dislodged nits will merely fall onto another portion of the crumpled fabric sheet, which is then discarded. The problem of removed nits subsequently returning to the infected person's hair, or another person's hair, is therefore avoided.

It will be understood that, although the foregoing description of lice/nit removal apparatus 20 has been provided with reference to a user who uses apparatus 20 to remove nits from another person's hair, lice/nit removal apparatus 20 can also be used by a person to remove nits from his or her own hair. That is, the person can grasp one of lice removal apparatuses 20 with one hand while holding a lock of his or her own hair and running the lice/nit removal apparatus 20 along the length of the lock of hair. Discarding the used apparatus 20 and grasping a new one can all be done with a single hand, thereby enabling the person to use his or her other hand to maintain the cleaned and uncleaned hair separate from each other, as described previously.

It will further be understood that, in some embodiments, the lice/nit removal apparatus 20 can be modified to include one or more chemicals, oils, or other substances designed to kill and/or prevent the return of the lice or nits. In such embodiments, lice/nit removal apparatus 20 operates to both mechanically strip nits and lice while also applying a chemical film (or film of another type of substance) to the individual's hair that helps eradicate the lice and nits. Such embodiments therefore provide a means for mounting a dual mechanical and chemical attack on the nits/lice. In other embodiments, however, no chemicals, oils, or other lice-killing or repelling substances are incorporated into the fabric of lice/nit removal apparatus 20.

Various alterations and changes can be made to the above-described embodiments without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of removing lice nits from a person's hair, the method comprising:
    grasping a first fabric sheet having a plurality of projections on a first face of the first fabric sheet;
    folding the first fabric sheet around a first lock of the person's hair such that the first face of the first fabric sheet contacts the first lock of the person's hair;
    squeezing the first fabric sheet while folded around the first lock of the person's hair;
    moving the first fabric sheet lengthwise along the first lock of the person's hair while squeezing the first fabric sheet around the first lock of the person's hair;
    disposing of the first fabric sheet;
    grasping a second fabric sheet having a plurality of projections on a first face of the second fabric sheet;
    folding the second fabric sheet around a second lock of the person's hair such that the first face of the second fabric sheet contacts the second lock of the person's hair;
    squeezing the second fabric sheet while folded around the second lock of the person's hair;
    moving the second fabric sheet lengthwise along the second lock of the person's hair while squeezing the second fabric sheet around the second lock of the person's hair;
    disposing of the second fabric sheet; and
    inserting a first digit of the user's hand into a first pocket defined on a second face of the first fabric sheet prior to squeezing the first fabric sheet around the first lock of the person's hair, the first pocket located adjacent a first end of the first fabric sheet.

2. The method of claim 1 further comprising inserting a second digit of the user's hand into a second pocket defined on the second face of the first fabric sheet prior to squeezing the first fabric sheet around the first lock of the person's hair, the second pocket located adjacent a second end of the first fabric sheet, the second end opposite the first end.

3. The method of claim 2 further comprising:
removing the first fabric sheet from a container while the first digit of the user's hand is inserted into the first pocket and the second digit of the user's hand is inserted into the second pocket.

4. The method of claim 3 further comprising retaining the first digit of the user's hand in the first pocket and the second digit of the user's hand in the second pocket during an entire time period defined between the removing the first fabric sheet from the container and the disposing of the first fabric sheet.

5. The method of claim 2 wherein at least some of the plurality of projections include thermoactive adhesive material adapted to become sticky in response to applied heat, the thermoactive adhesive material requiring more heat than that generated by the first and second digits of the user's hand to become sticky.

6. The method of claim 2 wherein the user and the person with the lice nits in his or her hair are different.

7. The method of claim 1 wherein the first and second fabric sheets include a non-woven fabric layer.

8. The method of claim 1 wherein the first and second fabric sheets are adapted to mechanically strip nits from the first and second locks of hair, respectively, and capture the stripped nits such that the stripped nits remain attached to the first and second fabric sheets, respectively.

9. The method of claim 1 wherein the first and second fabric sheets are made from a needled fleece material.

10. The method of claim 1 wherein the first and second fabric sheets are made from a fusible fabric that has not been fused.

11. A method of removing lice nits from a person's hair, the method comprising:
providing a fabric sheet having a plurality of projections on a first face of the fabric sheet;
inserting a thumb into a first pocket defined on a second face of the fabric sheet, the first pocket defined adjacent a first end of the fabric sheet;
inserting a finger into a second pocket defined on the second face of the fabric sheet, the second pocket defined adjacent a second end of the fabric sheet, the second end being opposite the first end;
folding the fabric sheet around a lock of the person's hair such that the first face of the fabric sheet contacts the lock of the person's hair;
squeezing the fabric sheet around the lock of the person's hair such that the first and second ends are pressed against the lock of the person's hair; and
moving the fabric sheet lengthwise along the lock of the person's hair while squeezing the fabric sheet around the lock of the person's hair.

12. The method of claim 11 further comprising removing the fabric sheet from a container by inserting the thumb into the first pocket and inserting the finger into the second pocket.

13. The method of claim 12 further comprising retaining the thumb in the first pocket and the finger in the second pocket during an entire time period defined between the removing the fabric sheet from the container and the moving the fabric sheet lengthwise along the lock of the person's hair.

14. The method of claim 13 wherein the fabric sheet is adapted to mechanically strip nits from the person's lock of hair and capture the stripped nits such that the stripped nits remain attached to the fabric sheet.

15. The method of claim 11 further comprising
disposing of the fabric sheet;
providing a second fabric sheet having a plurality of projections on a first face of the second fabric sheet;
inserting the thumb into a first pocket defined on the second face of the second fabric sheet, the first pocket defined adjacent a first end of the second fabric sheet;
inserting the finger into a second pocket defined on the second face of the second fabric sheet, the second pocket defined adjacent a second end of the second fabric sheet, the second end being opposite the first end;
folding the second fabric sheet around a second lock of the person's hair such that the first face of the second fabric sheet contacts the second lock of the person's hair;
squeezing the second fabric sheet around the second lock of the person's hair such that the first and second ends of the second fabric sheet are pressed against the second lock of the person's hair;
moving the second fabric sheet lengthwise along the second lock of the person's hair while squeezing the second fabric sheet around the second lock of the person's hair; and
disposing of the second fabric sheet.

* * * * *